United States Patent
Bumbulis

(10) Patent No.: US 10,372,693 B2
(45) Date of Patent: Aug. 6, 2019

(54) RANGE SEARCHES FOR DATABASE SYSTEMS

(71) Applicant: Sybase, Inc.

(72) Inventor: Peter Bumbulis, Waterloo (CA)

(73) Assignee: SYBASE, INC., Dublin, CA (US)

( * ) Notice: Subject to any disclaimer, the term of this patent is extended or adjusted under 35 U.S.C. 154(b) by 395 days.

(21) Appl. No.: 14/869,552

(22) Filed: Sep. 29, 2015

(65) Prior Publication Data

US 2017/0091239 A1    Mar. 30, 2017

(51) Int. Cl.
*G06F 17/30* (2006.01)
*G06F 16/22* (2019.01)
*G06F 16/245* (2019.01)

(52) U.S. Cl.
CPC ........ *G06F 16/2237* (2019.01); *G06F 16/245* (2019.01)

(58) Field of Classification Search
CPC ......... G06F 17/30324; G06F 17/30424; G06F 16/2237; G06F 16/245
See application file for complete search history.

(56) References Cited

U.S. PATENT DOCUMENTS

| | | | | |
|---|---|---|---|---|
| 5,852,821 A * | 12/1998 | Chen | ................. | G06F 17/30324 |
| 6,804,664 B1 * | 10/2004 | Hartman | ........... | G06F 17/30324 |
| 2009/0182724 A1 * | 7/2009 | Day | .................. | G06F 17/30442 |
| 2009/0313210 A1 * | 12/2009 | Bestgen | ............ | G06F 17/30324 |
| 2010/0082655 A1 * | 4/2010 | Silberstein | ........ | G06F 17/30477 707/759 |
| 2010/0299337 A1 * | 11/2010 | Aurin | ................ | G06F 17/30442 707/759 |
| 2012/0327097 A1 * | 12/2012 | Mostafa | .................... | G06T 9/00 345/555 |
| 2014/0149386 A1 * | 5/2014 | Konik | ............... | G06F 17/30442 707/713 |
| 2015/0220600 A1 * | 8/2015 | Bellamkonda | .... | G06F 17/30498 707/747 |

OTHER PUBLICATIONS

Martin Faust, Martin Grund, Tim Berning, David Schwalb, and Hasso Platner, "Vertical bit-Packing: Optimizing Operations on bit-Packed vectors Leveraging SIMD Instructions," Database Systems for Advanced Applications, vol. 8505, of the series Lecture Notes in Computer Science, pp. 132-145. Jul. 11, 2014.

Thomas Willhalm, Ismail Oukid, Ingo Mueller, "Vectorizing Database Column Scans with Complex Predicates," ADMS@VLDB, adms-conf.org. 2013. http://adms-conf.org/2013/muller_ads13.pdf.

* cited by examiner

*Primary Examiner* — Greta L Robinson
(74) *Attorney, Agent, or Firm* — Fountainhead Law Group P.C.

(57) ABSTRACT

Some embodiments provide a non-transitory machine-readable medium that stores a program. The program receives a query for a set of records in a database system having values in a field of a table that fall within a range of values. The program also determines a number of bits used to represent the values in the field of the table. The program further determines a set of operations to perform on the values in the field of the table based on the determined number of bits. The program also performs the determined set of operations on the values in the field of the table in order to identify the set of records in the database.

20 Claims, 6 Drawing Sheets

Employees Table

| Record | Sex | Department | Eye Color |
|---|---|---|---|
| 1 | Male | Human Resources | Black |
| 2 | Female | Management | Blue |
| 3 | Male | Engineering | Black |
| 4 | Female | Engineering | Brown |
| 5 | Female | Human Resources | Green |
| 6 | Female | Finance | Black |
| 7 | Male | Information Technology | Blue |
| 8 | Male | Legal | Blue |
| 9 | Female | Legal | Brown |

FIG. 2A

Dictionary for "Sex" Field

| 0 | Male |
|---|---|
| 1 | Female |

FIG. 2B

Dictionary for "Department" Field

| 0 | Human Resources |
|---|---|
| 1 | Engineering |
| 2 | Finance |
| 3 | Legal |
| 4 | Management |
| 5 | Information Technology |

FIG. 2C

Dictionary for "Eye Color" Field

| 0 | Brown |
|---|---|
| 1 | Black |
| 2 | Green |
| 3 | Blue |

FIG. 2D

Column Table 1

| Record | Sex |
|---|---|
| 1 | 0 |
| 2 | 1 |
| 3 | 0 |
| 4 | 1 |
| 5 | 1 |
| 6 | 1 |
| 7 | 0 |
| 8 | 0 |
| 9 | 1 |

Column Table 2

| Record | Department |
|---|---|
| 1 | 0 |
| 2 | 4 |
| 3 | 1 |
| 4 | 1 |
| 5 | 0 |
| 6 | 2 |
| 7 | 5 |
| 8 | 3 |
| 9 | 3 |

Column Table 3

| Record | Eye Color |
|---|---|
| 1 | 1 |
| 2 | 3 |
| 3 | 1 |
| 4 | 0 |
| 5 | 2 |
| 6 | 1 |
| 7 | 3 |
| 8 | 3 |
| 9 | 0 |

FIG. 2E

RANGE SEARCHES FOR DATABASE SYSTEMS

BACKGROUND

Database systems perform many data operations such as inserting data, deleting data, and searching data. When searching data in a database system, a search query may specify tables, fields in tables, values of fields in tables, etc. In some instances, a search query may specify a range of values for a field in a table in order to search for records in the table that have values in the field that fall within the range of values.

SUMMARY

In some embodiments, a non-transitory machine-readable medium stores a program that is executable by at least one processing unit. The program includes sets of instructions for receiving a query for a set of records in a database system having values in a field of a table that fall within a range of values. The program also includes sets of instructions for determining a number of bits used to represent the values in the field of the table. The program further includes sets of instructions for determining a set of operations to perform on the values in the field of the table based on the determined number of bits. The program also includes sets of instructions for performing the determined set of operations on the values in the field of the table in order to identify the set of records in the database.

In some embodiments, the set of operations includes logical operations. The set of operations may include comparison operations. The program may further include a set of instructions for adjusting end values of the range of values and the values in the field of the table. The set of instructions for performing the determined set of operations may include performing the comparison operations using the adjusted end values of the range of values and the adjusted values in the field of the table.

In some embodiments, the set of instructions for performing the determined set of operations on the values in the field of the table may include a set of instructions for simultaneously performing the determined set of operations on at least two values in the values in the field of the table. The set of instructions for determining the set of operations to perform on the values in the field of the table based on the determined number of bits may include sets of instructions for determining that the set of operations includes a first set of operations when the determined number of bits is equal to a particular number and determining that the set of operations includes a second set of operations, different than the first set of operations when the determined number of bits is greater than the particular number.

In some embodiments, the set of instructions for determining the set of operations to perform on the values in the field of the table based on the determined number of bits further includes a set of instructions for determining that the set of operations includes a third set of operations when the determined number of bits is less than the particular number.

In some embodiments, a method receives a query for a set of records in a database system having values in a field of a table that fall within a range of values. The method also determines a number of bits used to represent the values in the field of the table. The method further determines a set of operations to perform on the values in the field of the table based on the determined number of bits. The method also performs the determined set of operations on the values in the field of the table in order to identify the set of records in the database.

In some embodiments, the set of operations includes logical operations. The set of operations may include comparison operations. In some embodiments determining the set of operations to perform on the values in the field of the table based on the determined number of bits includes determining that the set of operations includes a first set of operations when the determined number of bits is equal to a particular number and determining that the set of operations includes a second set of operations, different than the first set of operations when the determined number of bits is greater than the particular number.

In some embodiments, performing the determined set of operations on the values in the field of the table includes storing results of the operations on the values in the field of the table in a bit array. The database system may, in some embodiments, be a column-oriented database system that stores tables in columns of data. In some embodiments, the database system is an in-memory database system that uses memory for storing data.

In some embodiments, a system includes a query controller configured to receive a query for a set of records in a database system having values in a field of a table that fall within a range of values. The system also includes a bit manager configured to determine a number of bits used to represent the values in the field of the table. The query controller may be further configured to determine a set of operations to perform on the values in the field of the table based on the determined number of bits. The system further includes a query processor configured to perform the determined set of operations on the values in the field of the table in order to identify the set of records in the database.

In some embodiments, the query controller determines the set of operations to perform on the values in the field of the table based on the determined number of bits by determining that the set of operations includes a first set of operations when the determined number of bits is equal to a particular number and determining that the set of operations includes a second set of operations, different than the first set of operations when the determined number of bits is greater than the particular number. In some embodiments the query processor is a first query processor and the system further includes a second query processor configured to perform the determined set of operations on the values in the field of the table in order to identify the set of records in the database. The query controller may be further configured to instruct the first query processor to perform the determined set of operations on the values in the field of the table when the query controller determines that the set of operations includes the first set of operations. The query controller may be also configured to instruct the second query processor to perform the determined set of operations on the values in the field of the table when the query controller determines that the set of operations includes the second set of operations. In some embodiments, the first set of operations includes logical operations and the second set of operations includes comparison operations.

In some embodiments, the set of operations includes comparison operations. The query processor may be further configure to adjust end values of the range of values and the values in the field of the table. In some embodiments, the query processor performs the determined set of operations by performing the comparison operations using the adjusted end values of the range of values and the adjusted values in the field of the table. In some embodiments, the query processor performs the determined set of operations on the values in the field of the table by simultaneously performing the determined set of operations on at least two values in the values in the field of the table.

The following detailed description and accompanying drawings provide a better understanding of the nature and advantages of the present invention.

BRIEF DESCRIPTION OF THE DRAWINGS

FIGS. 2A-2E illustrate an example of data stored in a column-oriented database system according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for processing range searches (also referred to as range queries) on data in a database system. In some embodiments, the number of bits used to represent values to be searched are determined. Based on the determination, different operations are performed on the data in the database in order to quickly and/or efficiently retrieve results from the database system. In some embodiments, different operations performed on the data include comparison operations (e.g., "equal to" operations, "less than" operations, "greater than" operations, etc.), logical operations (e.g., NOT operations, AND operations, OR operations, XOR operations, etc.), etc.

Figure 1:
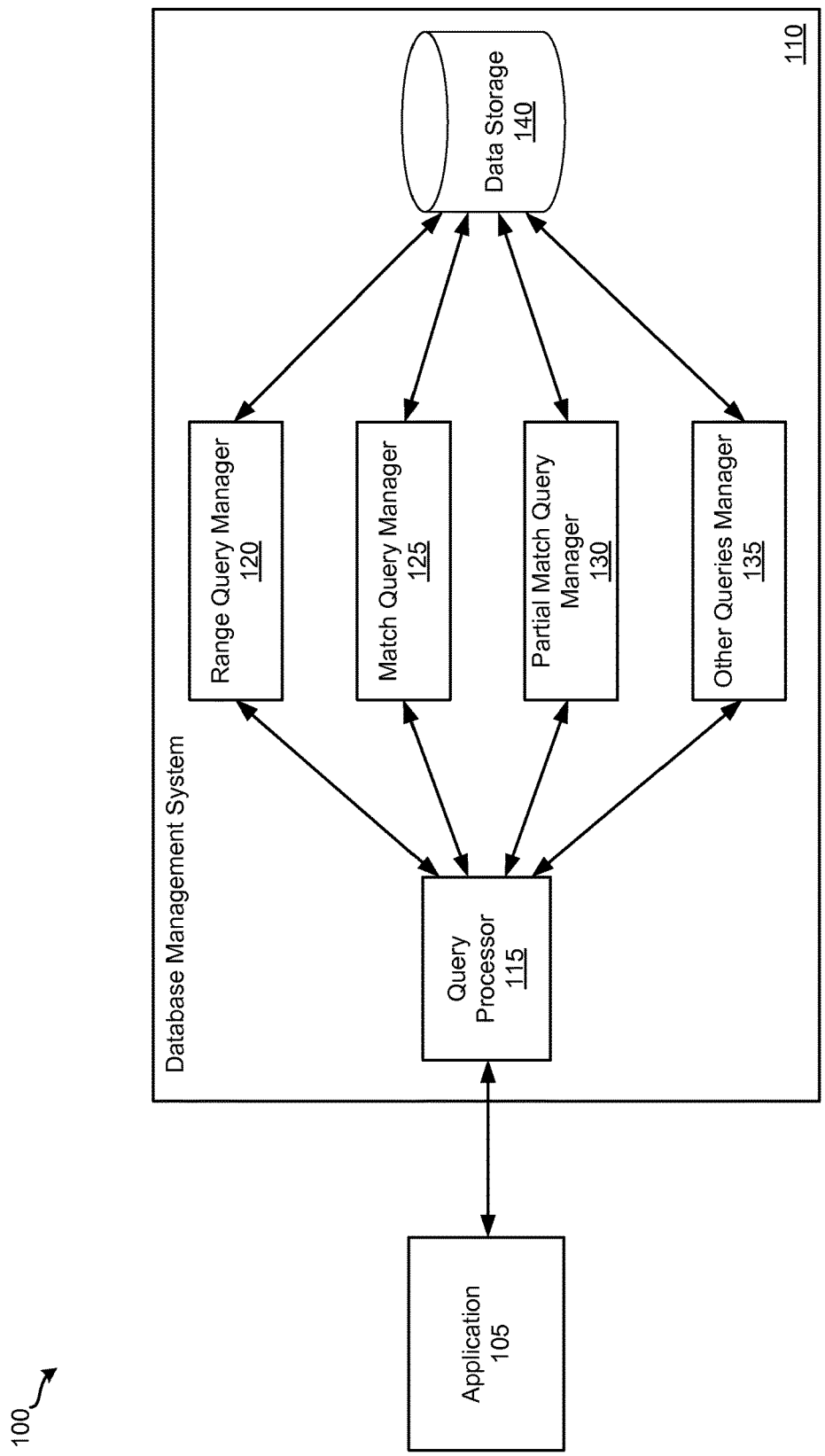
FIG. 1 illustrates a system for performing range searches according to some embodiments.

FIG. 1 illustrates a system 100 for processing range searches according to some embodiments. As shown, system 100 includes application 105 and database management system (DBMS) 110. Application 105 is configured to send requests for data (e.g., data stored in data storage 140) to DBMS 110 and, in response to such requests, receive data from DBMS 110. In some embodiments, the requests may be structured query language (SQL) queries, Datalog queries, Tutorial D queries, Dataphor queries, or any other type of queries for managing data in a DBMS. Application 105 may be a desktop application, a web application/service, a mobile application, etc. In some embodiments, application 105 operates on the same computing device as DBMS 110 while, in other embodiments, application 105 operates on a computing device separate from DBMS 110.

DBMS 110 is a database management system responsible for handling requests for data from application 105 and, in response to such requests, providing data to application 105. Examples of database management systems include SAP IQ, SAP HANA, Oracle Database, IBM DB2, IBM Informix, Microsoft SQL Server, etc. In some embodiments, a portion of DBMS 110 may be implemented as a set of libraries separate from the remaining portion of DBMS 110. For example, all, or a portion of, range query manager 120 may be implemented as a set of libraries separate from the rest of DMBS 110, in some such embodiments. In some embodiments, DBMS 110 is an in-memory DBMS that uses memory (e.g., non-volatile memory such as flash memory, volatile memory such as dynamic random access memory (DRAM), static random-access memory (SRAM), etc.) for storing data. DBMS 110, in some embodiments, is implemented via a cloud computing.

In some embodiments, DBMS 110 is a column-oriented DBMS. A column-oriented DBMS stores, in some such embodiments, data tables in sections of columns of data. In other embodiments, DBMS 110 is a row-oriented DBMS. A row-oriented DBMS stores, in other such embodiments, data tables in rows of data. In yet other embodiments, DBMS 110 a hybrid column-oriented and row-oriented DBMS that stores data tables in sections of columns of data and/or rows of data.

Referring to FIGS. 2A-2E, an example of data stored in a column-oriented database system is illustrated according to some embodiments. Specifically, FIG. 2A shows a table of example records of employees' sex, department in which they work, and eye color. In particular, each record has a value (e.g., male or female) for a "Sex" field, a value (e.g., human resources, management, engineering, finance, information technology (IT), or legal) for a "Department" field, and a value (e.g., brown, black, green, or blue) for an "Eye Color" field. FIG. 2B illustrates a dictionary (also referred to as a dictionary vector) for the "Sex" field shown in FIG. 2A. The dictionary in FIG. 2B lists the possible values (e.g., male and female) for the "Sex" field and their corresponding value identifiers (e.g., 0 and 1). FIG. 2C illustrates a dictionary for the "Department" field shown in FIG. 2A. The dictionary in FIG. 2C lists the possible values (e.g., human resources, management, engineering, finance, IT, and legal) for the "Department" field and their corresponding value identifiers (e.g., 0, 1, 2, 3, 4, and 5). FIG. 2D illustrates a dictionary for the "Eye Color" field shown in FIG. 2A. The dictionary in FIG. 2D lists the possible values (e.g., brown, black, green, and blue) for the "Eye Color" field and their corresponding value identifiers (e.g., 0, 1, 2, and 3).

FIG. 2E illustrates column tables (also referred to as column data arrays or index vectors) for the fields shown in FIG. 2A. Each column table stores the value identifiers specified in the respective dictionary that corresponds to the values of the records in the table of FIG. 2A. In some embodiments, the value identifiers in a column table are stored in a bit vector of n-bit values, where n is the smallest number of bits needed to represent all the possible value identifiers. For instance, the value identifiers in Column Table 1 may be stored in a bit vector of 1-bit values because one bit is the smallest number of bits need to represent the all the possible value identifiers (e.g., 0 and 1) in the dictionary for the "Sex" field shown in FIG. 2B. As another example, the value identifiers in Column Table 2 may be stored in a bit vector of 3-bit values because three bits is the smallest number of bits need to represent the all the possible value identifiers (e.g., 0, 1, 2, 3, 4, and 5) in the dictionary for the "Department" field shown in FIG. 2C. As yet another example, the value identifiers in Column Table 3 may be stored in a bit vector of 2-bit values because two bits is the smallest number of bits need to represent the all the possible value identifiers (e.g., 0, 1, 2, and 3) in the dictionary for the "Eye Color" field shown in FIG. 2D.

Returning back to FIG. 1, DBMS 110 includes query processor 115, range query manager 120, match query manager 125, partial match query manager 130, other queries manager 135, and data storage 140. Query processor 115 handles the processing of requests for data that query processor 115 receives from application 105. When query processor 115 receives a request for data from application 105, query processor 115 analyzes the request and determines the type of the request. Examples of types of requests for data include a range query, a match query, a partial match query, etc. Based on the determined type of the request, query processor 115 forwards the request to range query manager 120, match query manager 125, partial match query manager 130, and/or other queries manager 135. For instance, query processor 115 may forward requests that include range queries to range query manager 120, requests that include match queries to match query manager 125, requests that include partial match queries to partial match query manager 130, and requests that include any other type of queries to other queries manager 135.

In some embodiments, query processor 115 may translate a query into a range query. Referring to FIG. 2A as an example, a query may specify for records of employees that work in the Engineering, Finance, or Legal department. Query processor 115 may reference the dictionary for the "Department" field, as illustrated in FIG. 2C and determine that the value identifiers for the Engineering, Finance, and Legal department are 1, 2, and 3, which forms a range of 1-3. Thus, in this example, query processor 115 translates the query into a range query that specifies for employees that work in a department having a corresponding value identifier falling within 1-3 (e.g., a value identifier of 1, 2, or 3) and forwards the translated query to range query manager 120.

Upon forwarding data requests to range query manager 120, match query manager 125, partial match query manager 130, and other queries manager 135, query processor 115 may receive, in response to the data requests, query results from the respective range query manager 120, match query manager 125, partial match query manager 130, and other queries manager 135. When query processor 115 receives query results, query processor 115 forwards the query results to application 105.

Range query manager 120 processes data requests that include range queries. In some embodiments, a range query specifies a range of values of a field (e.g., a field/column in a database table). When range query manager 120 processes a range query in some such embodiments, range query manager 120 retrieves records from data storage 140 having a field value that falls within the range of values specified by the range query. For example, a range query may specify a range of values 25-35 for a field that represents the age of employees. When range query manager 120 processes the example range query, range query manager 120 may retrieve employee records having a value in the age field that falls within the range of values 25-35.

Match query manager 125 processes data requests that include match queries. In some embodiments, a match query specifies a value of a field (e.g., a field/column in a database table). When match query manager 125 processes a match query in some such embodiments, match query manager 125 retrieves records from data storage 140 having a field value that matches (e.g., equals) the value specified by the match query. For example, a match query may specify a value of 27 for a field that represents the age of employees. When match query manager 125 processes the example match query, match query manager 125 may retrieve employee records having a value in the age field that matches the value 27.

Partial match query manager 130 processes data requests that include partial match queries. In some embodiments, a partial match query specifies a value of a field (e.g., a field/column in a database table). When partial match query manager 130 processes a partial match query in some such embodiments, partial match query manager 130 retrieves records from data storage 140 having a field value that partially matches the value specified by the partial match query. For example, a partial match query may specify a value of "John" for a field that represents the name of employees. When partial match query manager 130 processes the example partial match query, partial match query manager 130 may retrieve employee records having a value in the name field that includes and/or matches the value "John" (e.g., employee records having names "John Smith," "Jane Johnson," "George John," etc.).

Other queries manager 135 processes data requests that include queries other than range queries, match queries, and partial match queries. Examples of such queries include append queries, make-table queries, update queries, delete queries, etc. When other queries manager 135 processes a query in some such embodiments, other queries manager 135 interacts with data storage 140 according to the query specified in the data request. For example, other queries manager 135 inserts data/records into data storage 140 when the data request specifies an append query, creates a table in data storage 140 when the data request specifies a make-table query, updates data/records in data storage 140 when the data request specifies an update query, deletes data/records into data storage 140 when the data request specifies a delete query, etc.

Data storage 140 is configured to store data in an organized manner. In some embodiments, data storage 140 is implemented as one or more non-volatile storages (e.g., hard disk storages, flash memory storages, optical disc storages, etc.). As mentioned above, DBMS 110 is, in some embodiments, an in-memory DBMS that uses memory for storing data. In some such embodiments, data storage 140 is implemented as non-volatile memory (e.g., flash memory), volatile memory (e.g., dynamic random access memory (DRAM), static random-access memory (SRAM), etc.), or a combination of non-volatile memory, volatile memory, and/or other types of memory.

FIG. 1 illustrates an application interacting with a DBMS for the purposes of simplicity and explanation. One of ordinary skill in the art will understand that the system shown in FIG. 1 may include any number of applications (e.g., desktop applications, web applications/services, mobile applications, etc.) operating on the same computing device as, or a different computing device than, DBMS 110 and performing the same or similar functions as application 105. In addition, FIG. 1 shows a data storage in a DBMS for the purposes simplicity and explanation. One of ordinary skill in the art will appreciate that data storage 140 may be implemented by any number of data storages.

Figure 3:
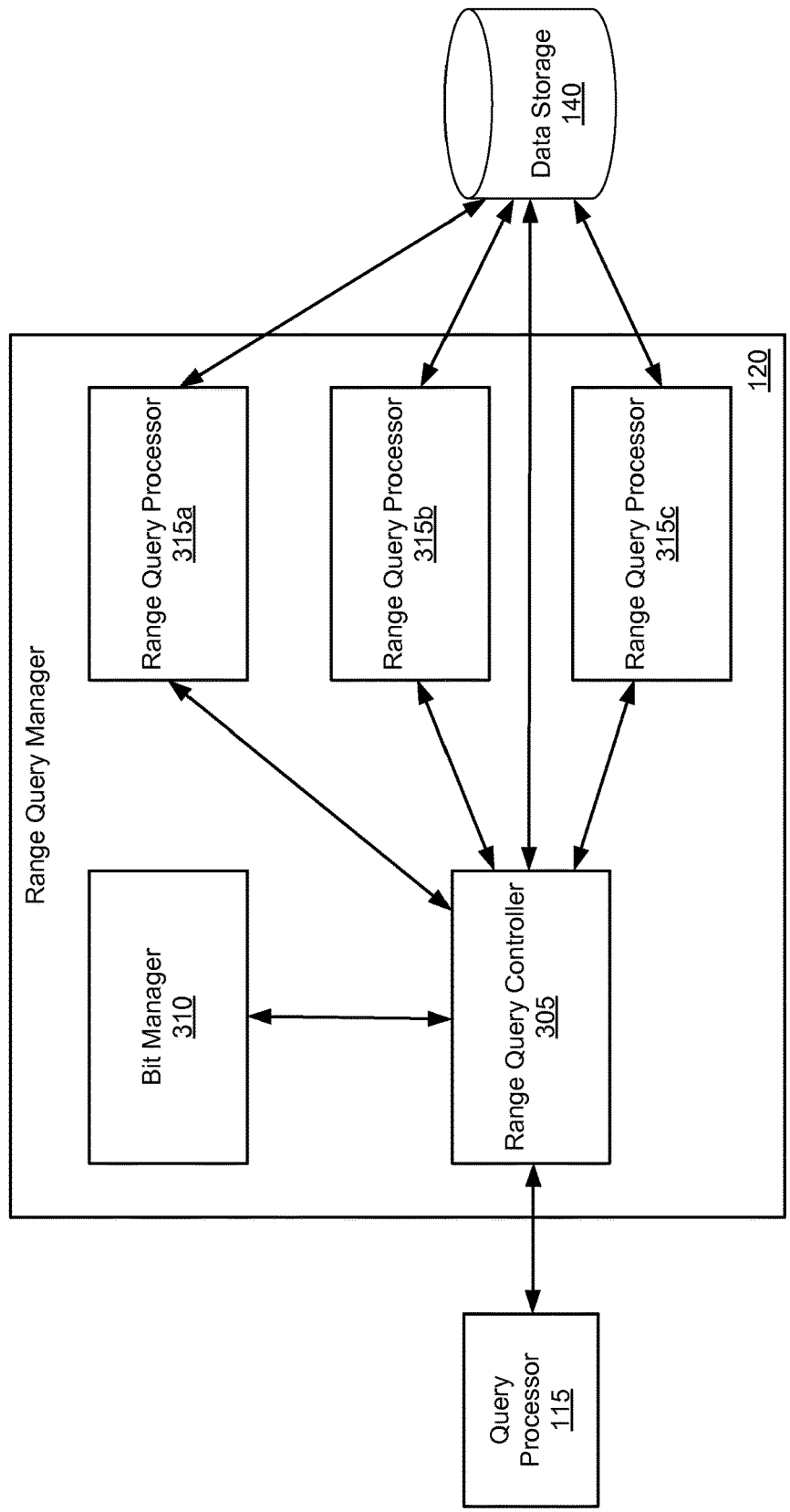
FIG. 3 illustrates a range query manager according to some embodiments.

FIG. 3 illustrates a range query manager according to some embodiments. Specifically, FIG. 3 shows query processor 115, range query manager 120, and data store 140. As mentioned above, range query manager 120 may process data requests that include range queries. As illustrated, range query manager 120 includes range query controller 305, bit manager 310, range query processors 315a-c.

Range query controller 305 manages the processing of range queries that range query controller 305 receives from query processor 115. In some embodiments, a range query specifies a range of values of a field (e.g., a field/column in a database table). When range query controller 305 receives a data request that includes a range query from query processor 115, range query controller 305 identifies a column table from data storage 140 that corresponds to a field in a table on which the range query is to be performed. Range query controller 305 then sends the column table (or a reference to the column table) to bit manager 310 and instructs bit manager 310 to determine the bit length used to represent the values stored in the column table. In response to receiving the determined bit length from bit manager 310, range query controller 305 identifies a range query processor 315 to process the range query on the column table in order to retrieve records from the table stored in data storage 140 having a field value that falls within the range of values specified by the range query.

Range query controller 305 may receive results of the range query from the range query processor 315. In some embodiments, the results of a range query may be stored in a bit array. Each bit in the bit array corresponds to a record in a table that includes a field on which the range query is performed. A bit value of 1 in the bit array may indicate that the field of the corresponding record in the table has a value that falls within the range specified by the range query and a bit value of 0 in the bit array may indicate that the field of the corresponding record in the table has a value that falls outside the range specified by the range query. In some such embodiments, range query controller 305 may retrieve the records corresponding to the bits in the bit array having a bit value of 1 and return the retrieved records to query processor 115.

Bit manager 310 is responsible for determining the number of bits used to represent values of a field (e.g., values stores in a column table) on which a range query will be performed. As mentioned above, the values (e.g., value identifiers) in a column table are, in some embodiments, stored in a bit vector of n-bit values, where n is the smallest number of bits needed to represent all the possible value identifiers. In some embodiments, when bit manager 310 receives a column table (or a reference to the column table) from range query controller 305, bit manager 310 analyzes the values stored in the column table in order to determine the number of bits used to represent the values stored in the column table. In other embodiments, bit manager 310 analyzes the dictionary for the field associated with the column table (e.g., by identifying the number of value identifiers in the dictionary and calculating the number of bits needed to represent the number of value identifiers) in order to determine the number of bits used to represent the values stored in the column table.

Range query processors 315a-c are responsible for processing range queries on different sets of values based on different bit lengths used to represent the sets of values. In particular, each range query processor 315a-c is responsible for processing range queries on a set of values represented by a particular bit length or a particular range of bit lengths. For example, range query processor 315a may be responsible for processing range queries on sets of values represented by 1-bit (e.g., the values in Column Table 1 illustrated in FIG. 2E), range query processor 315b may be responsible for processing range queries on sets of values represented by 2-bits (e.g., the values in Column Table 3 illustrated in FIG. 2E), and range query processor 315c may be responsible for processing range queries on sets of values represented by more than two bits (e.g., 3-bits, 6-bits, 8-bits 11-bits, 16-bits, 32-bits, etc.). In some embodiments, range query processors 315a-c store the results of a range query in a bit array. Each bit in the bit array corresponds to a record in a table that includes a field on which the range query is performed. A bit value of 1 in the bit array may indicate that the field of the corresponding record in the table has a value that falls within the range specified by the range query and a bit value of 0 in the bit array may indicate that the field of the corresponding record in the table has a value that falls outside the range specified by the range query. Referring to FIGS. 2A-2E as an example, a range query processor 315 may process a range query that specifies employees with an eye color having a corresponding value identifier falling within 0-2 (e.g., an eye color of brown, black, or green, which have corresponding value identifiers of 0, 1, and 2, respectively). In such an example, the range query processor 315 stores the results of the range query in the following 9-bit long bit array: 101111001. The left-most bit corresponds to the first record (i.e., record 1) in the Employees table and the right-most bit corresponds to the last record (i.e., record 9) in the Employees table.

In some embodiments, different operations are utilized for processing range queries on sets of values based on different bit lengths used to represent the sets of values. The following Tables 1-3 illustrate example operations for processing range queries based on the bit length used to represent values in a set of values:

TABLE 1

1-Bit Length Values

| Range [a, b) | Operation |
|---|---|
| a >= b | result[i] = 0 |
| a > 1 | result[i] = 0 |
| a = 0, b = 1 | result[i] = ~source[i] |
| a = 0, b >= 2 | result[i] = 1 |
| a = 1, b >= 2 | result[i] = source[i] |

TABLE 2

2-Bit Length Values

| Range [a, b) | Operation |
|---|---|
| a >= b | result[i] = 0 |
| a > 3 | result[i] = 0 |
| a = 0, b >= 4 | result[i] = 1 |
| a = 0, b = 1 | result[i] = ~((source[i] >> 1)\|source[i]) |
| a = 0, b = 2 | result[i] = ~(source[i] >> 1) |
| a = 0, b = 3 | result[i] = ~((source[i] >> 1) & source[i]) |
| a = 1, b = 2 | result[i] = (~(source[i] >> 1)) & source[i] |
| a = 1, b = 3 | result[i] = (source[i] >> 1) ^ source[i] |
| a = 1, b >= 4 | result[i] = (source[i] >> 1)\|source[i] |
| a = 2, b = 3 | result[i] = (source[i] >> 1) & ~source[i] |
| a = 2, b >= 4 | result[i] = source[i] >> 1 |
| a = 3, b >= 4 | result[i] = (source[i] >> 1) & source[i] |

TABLE 3 k-Bit Length Values

| Range [a, b) | Operation |
|---|---|
| a >= b; a > $2^k$ | result[i] = 0 |
| a = 0, b >= $2^k$ | result[i] = 1 |
| a = 0 | result[i] = (source[i] > b) |
| b >= $2^k$ | result[i] = (a <= source[i]) |

TABLE 3-continued k-Bit Length Values

| Range [a, b) | Operation |
|---|---|
| b = a + 1 | result[i] = (source[i] == a) |
| catchall | result[i] = (a <= source[i] < b) |

Referring to Tables 1-3 above, the Range [a, b) specifies a range between a and b that includes the value of a and excludes the value of b, source[i] is the $i^{th}$ value in a bit vector storing the column table, and result[i] is the $i^{th}$ bit in a bit array for storing the lowest bit of the result of an operation. For the specified operations in Tables 1 and 2, "~" represents a negation operation (e.g., switch each binary 1 to 0 and switch each binary 0 to 1), ">>1" represents a one bit right-shift operation, "|" represents a logical OR operation, "&" represents a logical AND operation, and "^" represents a logical XOR operation. For the specified operations in Table 3, ">" represents a "greater than" comparison operation, "<=" represents a "less than or equal to" comparison operation, "==" represents an "is equal to" comparison operation, and "<" represents a "less than" comparison operation.

In some embodiments, a range query processor 315 (e.g., range query processor 315a) responsible for processing 1-bit length values performs the operations specified in Table 1 by evaluating the values of the range specified in the range query and performing the corresponding operation based on the evaluation. As mentioned above, the value identifiers in a column table may be stored in a bit vector of n-bit values, where n is the smallest number of bits needed to represent all the possible value identifiers. The range query processor 315, in some embodiments, performs the operations specified in Table 1 directly on the bit vector of 1-bit values (as opposed to extracting each 1-bit value and operating on the 1-bit value). For instance, to perform a logical negation operation (e.g., represented as "~" in Table 1), the logical negation operation is performed on the entire bit vector of 1-bit values.

In some embodiments, values of a column table are represented using unsigned values and processing unit(s) of a computing device implementing range query manager 120 are configured to perform operations on signed values (e.g., two's complement values). In some such embodiments, a range query processor 315 (e.g., range query processor 315c) that performs the operations specified in Table 3 may perform the process described below by reference to FIG. 5 in order to perform operations on the unsigned values of a column table.

In some embodiments, processing unit(s) of a computing device implementing range query manager 120 have registers of a particular bit length (e.g., 128 bits, 256 bits, etc.). The processing units in some such embodiments may be configured to perform single instruction, multiple data (SIMD) operations on the registers, thereby allowing the processing units to treat such registers as an array of smaller registers (e.g., 8-bit, 16-bit, 32-bit, and/or 64-bit registers) and operate on the values in parallel. These smaller registers may be referred to as sub-registers. For example, a processing unit may load eight 16-bit values in a 128-bit register and perform a 16-bit operation (e.g., add, subtract, etc.) simultaneously on each of the eight 16-bit values. In some embodiments, SIMD operations are utilized to perform the operations specified in Tables 1-3 on values in parallel. In some embodiments, SIMD operations are utilized to perform the operations specified in Table 1 on values in parallel while non-SIMD operations are utilized to perform operations specified in Tables 1 and 2 on values in parallel.

In some embodiments, range query processors 315a-c may load the values in a column table (e.g., stored as a bit vector of n-bit values) into the array of smaller registers and instruct the processing unit(s) to simultaneously perform operations (e.g., operations specified in Tables 1-3) on the loaded values. Range query processors 315a-c may continue to load values in the column table and instruct the processing unit(s) to simultaneously perform operations on the loaded values until all the values in the column table have been operated on. In some such embodiments, range query processors 315a-c loads the values in a column table into the smallest sub-registers that can accommodate the bit length of the values. For instance, assuming that a 128-bit register can be operated on in an 8-bit, 16-bit, or 32-bit basis, range query processors 315a-c may load bit values ranging from 1-bit values to 8-bit values into 8-bit sub-registers, bit values ranging from 9-bit values to 16-bit values into 16-bit sub-register, etc. As mentioned above, results of a range query may be stored in a bit array. In some embodiments, the results of parallel operations performed on values loaded in sub-registers are contained in the low order bit of each sub-register (e.g., every $n^{th}$-bit in the register). In some such embodiments, a parallel extract operation (e.g., PEXT operation for Intel processors) is performed in order to remove extra bits and extract the low order bits into the bit array.

FIG. 3 shows three different range query processors for processing range queries set based on different sets of values represented by different bit lengths. One of ordinary skill in the art will understand that additional and/or different range query processors may be implemented in different embodiments. For example, in some embodiments, range query manager 120 may include a fourth range query processor that is responsible for processing range queries on sets of values represented by 3-bits (e.g., the values in Column Table 2 illustrated in FIG. 2E), and range query processor 315c may be responsible for processing range queries on sets of values represented by more than three bits (e.g., 4-bits, 6-bits, 8-bits 11-bits, 16-bits, 32-bits, etc.). In some such embodiments, the operations specified for processing range queries on sets of values represented by 3-bits are similar to the operations specified in Tables 1 and 2. For instance, operations (e.g., Boolean expression operations that operate on the bits of the values) are specified for each possible pair of values a and b of a range [a, b). In addition, the operations may be implemented in the same or similar manner as the operations specified in Tables 1 and 2. For example, operations may be performed on values in parallel (e.g., using SIMD and/or non-SIMD operations), results of the operations may be stored in a bit array (e.g., by using a parallel extract operation to remove extra bits and extract the low order bits into the bit array), etc. One of ordinary skill in the art will understand the same or similar methodology may be employed for implementing operations specified for processing range queries on sets of values represented by other bit lengths (e.g., 4-bits, 5-bits, 6-bits, etc.).

Figure 4:
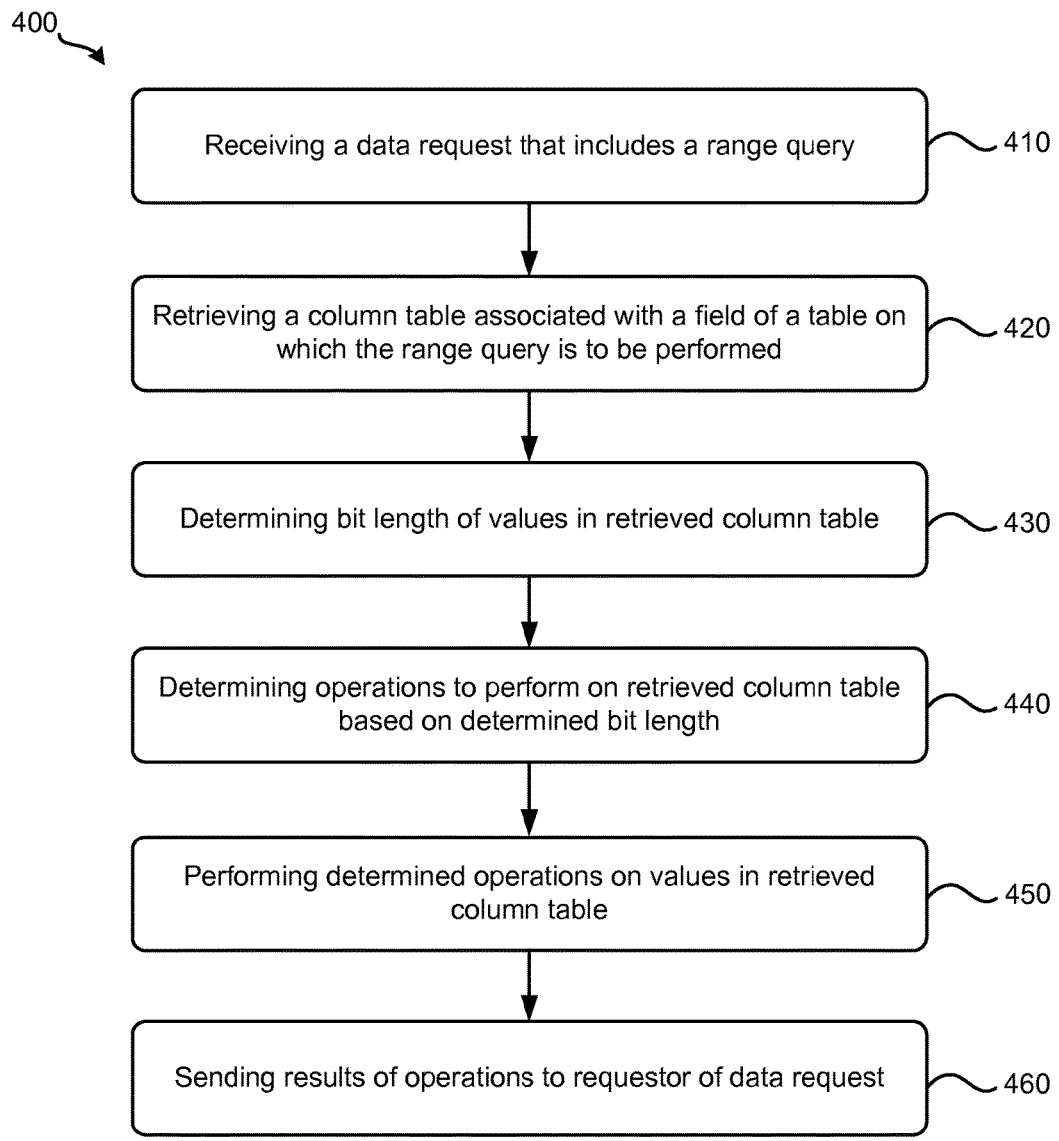
FIG. 4 illustrates a process for processing a range search according to some embodiments.

FIG. 4 illustrates a process 400 for processing a range search according to some embodiments. In some embodiments, a range query manager (e.g., range query manager 120) performs process 400. Process 400 starts by receiving, at 410, a data request that includes a range query. In some embodiments, process 400 receives the data request from a query processor (e.g., query processor 115).

Next, process 400 retrieves, at 420, a column table associated with a field of a table on which a range query is to be performed. Referring to FIGS. 2A-2E as an example, a range query may specify for employees with an eye color having a corresponding value identifier falling within 0-2 (e.g., an eye color of brown, black, or green, which have corresponding value identifiers of 0, 1, and 2, respectively). In this example, process 400 retrieves Column Table 3 shown in FIG. 2E as this column table is associated with the "Eye Color" field in the table shown in FIG. 2A.

At 430, process 400 determines the bit length of the values in the retrieved column table. As mentioned above, the values (e.g., value identifiers) in a column table are, in some embodiments, stored in a bit vector of n-bit values, where n is the smallest number of bits needed to represent all the possible value identifiers. Referring to FIGS. 2D and 2E as an example, the value identifiers in Column Table 3 of FIG. 2E are stored in a bit vector of 2-bit values because two bits is the smallest number of bits need to represent the all the possible value identifiers (e.g., 0, 1, 2, and 3) in the dictionary for the "Eye Color" field shown in FIG. 2D. In this example, process 400 determines the bit length of the values in Column Table 3 as a bit length of two.

Next, process 400 determines, at 440, operations to perform on the retrieved column table based on the determined bit length. The Tables 1-3 above illustrate example operations to perform based on the determined bit length of the values in the retrieved column table. That is, the operations shown in Table 1 are performed on the values in the retrieved column when the values are represented by 1-bit, the operations shown in Table 2 are performed on the values in the retrieved column when the values are represented by 2-bit, and the operations shown in Table 3 are performed on the values in the retrieved column when the values are represented by bits greater than two. As shown in Tables 1-3, different operations are performed based on different ranges of values specified in a range query.

At 450, process 400 performs the determined operations on values in the retrieved column table. In some embodiments, process 400 performs the operations on multiple values at the same time by using SIMD operations and/or non-SIMD operations, as described above. For example, in some embodiments, non-SIMD operations are utilized to perform operations specified in Tables 1 and 2 on values in parallel and SIMD operations are utilized to perform the operations specified in Table 1 on values in parallel. As mentioned above, values of a column table are represented using unsigned values and processing unit(s) of a computing device implementing range query manager 120 are configured to perform operations on signed values (e.g., two's complement values), in some embodiments. Process 400, in some such embodiments, performs operations on unsigned values using signed operators according to the process described below in FIG. 5.

Finally, process 400 sends, at 460, the results of the data request back to the requestor. In some embodiments, process 400 sends the results of the data request to a query processor (e.g., query processor 115). As mentioned above, the results of a range query may be stored in a bit array and a bit value of 1 in the bit array may indicate that a field of a corresponding record in a table has a value that falls within the range specified by the range query. Process 400 may, in some embodiments, retrieve the records corresponding to the bits in the bit array having a bit value of 1 and return the retrieved records to the requestor.

Figure 5:
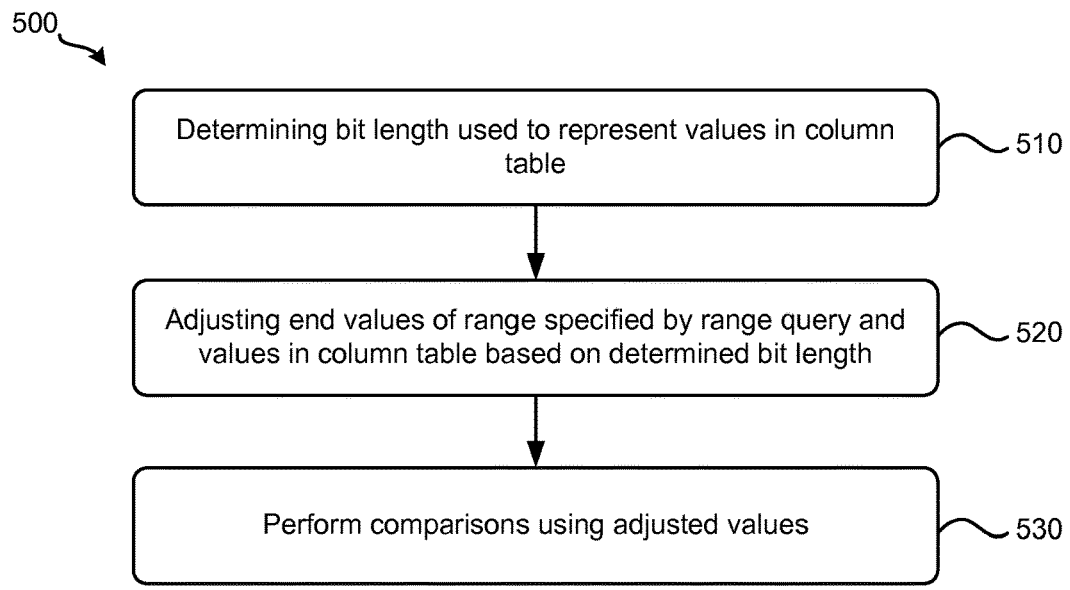
FIG. 5 illustrates a process for performing operations on unsigned values using signed operators according to some embodiments.

As mentioned above, values of a column table are represented using unsigned values and processing unit(s) of a computing device implementing range query manager 120 are configured to perform operations on signed values (e.g., two's complement values), in some embodiments. FIG. 5 illustrates a process 500 for performing operations on unsigned values using signed operators according to some embodiments. In some embodiments, a range query processor (e.g., range query processor 315c) performs process 500 to perform the operations specified in Table 3 above in order to perform operations on the unsigned values of a column table. Process 500 starts by identifying, at 510, signed m-bit operations based on unsigned values in a column table and a range of unsigned values specified in a range query. In some embodiments, process 500 identifies the signed m-bit operations such that the unsigned values in the column table and the range of unsigned values specified in the range query fall between 0 and $2^m-1$ (0 and $2^m-1$ included).

Next, process 500 converts, at 520, the unsigned values in the column table and the range of unsigned values specified in the range query to signed values based on the identified signed m-bit operations. In some embodiments, process 500 converts the unsigned values by subtracting $2^{m-1}$ from each of the values. Process 500, in some such embodiments, subtracts $2^{m-1}$ from a value by performing an XOR operation on $2^{m-1}$ and the unsigned value as illustrated in the following equation:

$$\text{value}_{signed} = (\text{value}_{unsigned}) - (2^{m-1}) = (\text{value}_{unsigned}) \text{XOR} (2^{m-1})$$

where $\text{value}_{unsigned}$ is the unsigned value and $\text{value}_{signed}$ is the converted value. In some embodiments, process 500 performs the conversion on multiple values at the same time by using SIMD operations, as described above.

Finally, process 500 performs, at 530, the signed m-bit operations on the converted signed values. In some embodiments, process 500 performs the comparison operations on multiple values at the same time by using SIMD operations, as described above.

Figure 6:
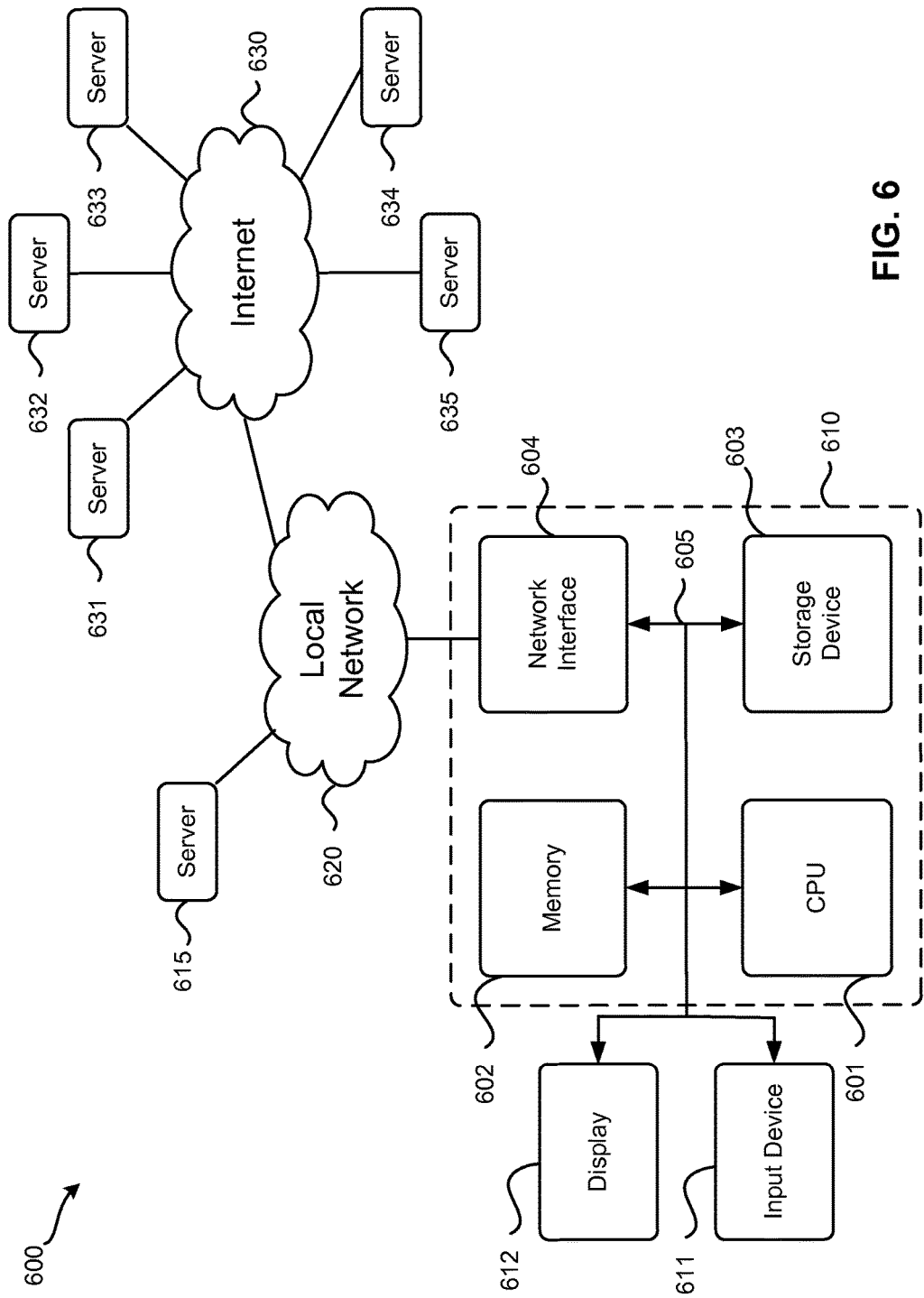
FIG. 6 illustrates an exemplary computer system according to some embodiments.

An exemplary computer system 600 is illustrated in FIG. 6. Computer system 610 includes a bus 605 or other communication mechanism for communicating information, and a processor 601 coupled with bus 605 for processing information. Computer system 610 also includes memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit, the program comprising sets of instructions for:
   receiving, by a query controller, a query for a set of records in a database system having values in a field of a table that fall within a range of values;
   determining, by a bit manager, a number of bits used to represent the values in the field of the table;
   determining, by the query controller, a set of operations to perform on the values in the field of the table by selecting the set of operations from a plurality of sets of operations based on the determined number of bits, wherein different sets of operations in the plurality of sets of operations are configured for use with values represented by different numbers of bits, wherein the selected set of operations is configured for use with values represented by the determined number of bits; and
   processing, by a query processor, the query by selecting a range query processor from a plurality of range query processors based on the determined number of bits and using the selected range query processor to perform the determined set of operations on the values in the field of the table in order to identify the set of records in the database.

2. The non-transitory machine-readable medium of claim 1, wherein the set of operations comprises logical operations.

3. The non-transitory machine-readable medium of claim 1, wherein the set of operations comprises comparison operations.

4. The non-transitory machine-readable medium of claim 1, wherein the set of instructions for performing the set of operations on the values in the field of the table comprises sets of instructions for:
   selecting an operation from the set of operations based on a first value and a second value, wherein the range of values is specified by the first value and the second value, wherein the first value is included in the range of values and the second value is excluded from the range of values; and
   performing the selected operation on the values in the field of the table.

5. The non-transitory machine-readable medium of claim 4, wherein the set of instructions for performing the determined set of operations on the values in the field of the table further comprises a set of instructions for simultaneously performing the selected operation on at least two values in the values in the field of the table.

6. The non-transitory machine-readable medium of claim 1, wherein the set of instructions for determining the set of operations to perform on the values in the field of the table based on the determined number of bits comprises sets of instructions for:
   selecting a first set of operations from the plurality of sets of operations as the set of operations when the determined number of bits is equal to a particular number; and
   selecting a second set of operations from the plurality of sets of operations as the set of operations when the determined number of bits is greater than the particular number.

7. The non-transitory machine-readable medium of claim 6, wherein the set of instructions for determining the set of operations to perform on the values in the field of the table based on the determined number of bits further comprises a set of instructions for selecting a third set of operations from the plurality of sets of operations as the set of operations when the determined number of bits is less than the particular number.

8. A method comprising:
   receiving, by a query controller, a query for a set of records in a database system having values in a field of a table that fall within a range of values;
   determining, by a bit manager, a number of bits used to represent the values in the field of the table;
   determining, by the query controller, a set of operations to perform on the values in the field of the table by selecting the set of operations from a plurality of sets of operations based on the determined number of bits, wherein different sets of operations in the plurality of sets of operations are configured for use with values represented by different numbers of bits, wherein the selected set of operations is configured for use with values represented by the determined number of bits; and processing, by a query processor, the query by selecting a range query processor from a plurality of range query processors based on the determined number of bits and using the selected range query processor to perform the determined set of operations on the values in the field of the table in order to identify the set of records in the database.

9. The method of claim 8, wherein the set of operations comprises logical operations.

10. The method of claim 8, wherein the set of operations comprises comparison operations.

11. The method of claim 8, wherein determining the set of operations to perform on the values in the field of the table based on the determined number of bits comprises:

selecting a first set of operations from the plurality of sets of operations as the set of operations when the determined number of bits is equal to a particular number; and selecting a second set of operations from the plurality of sets of operations as the set of operations when the determined number of bits is greater than the particular number.

12. The method of claim 8, wherein performing the determined set of operations on the values in the field of the table comprises storing results of the operations on the values in the field of the table in a bit array.

13. The method of claim 8, wherein the database system is a column-oriented database system that stores tables in columns of data.

14. The method of claim 8, wherein the database system is an in-memory database system that uses memory for storing data.

15. A system comprising:

a query controller configured to receive a query for a set of records in a database system having values in a field of a table that fall within a range of values;

a bit manager configured to determine a number of bits used to represent the values in the field of the table, wherein the query controller is further configured to determine a set of operations to perform on the values in the field of the table by selecting the set of operations from a plurality of sets of operations based on the determined number of bits, wherein different sets of operations in the plurality of sets of operations are configured for use with values represented by different numbers of bits, wherein the selected set of operations is configured for use with values represented by the determined number of bits; and a query processor configured to a range query manager configured to process the query by selecting a range query processor from a plurality of range query processors based on the determined number of bits and using the selected range query processor to perform the determined set of operations on the values in the field of the table in order to identify the set of records in the database.

16. The system of claim 15, wherein the query controller determines the set of operations to perform on the values in the field of the table based on the determined number of bits by:

selecting a first set of operations from the plurality of sets of operations as the set of operations when the determined number of bits is equal to a particular number; and selecting a second set of operations from the plurality of sets of operations as the set of operations when the determined number of bits is greater than the particular number.

17. The system of claim 16, wherein the query processor is a first query processor, the system further comprising a second query processor configured to perform the determined set of operations on the values in the field of the table in order to identify the set of records in the database, wherein the query controller is further configured to instruct the first query processor to perform the determined set of operations on the values in the field of the table when the query controller selects the first set of operations as the set of operations and instruct the second query processor to perform the determined set of operations on the values in the field of the table when the query controller selects the second set of operations as the set of operations.

18. The system of claim 16, wherein the first set of operations comprises logical operations and the second set of operations comprises comparison operations.

19. The system of claim 15, wherein the query processor performs the set of operations on the values in the field of the table by:

selecting an operation from the set of operations based on a first value and a second value, wherein the range of values is specified by the first value and the second value, wherein the first value is included in the range of values and the second value is excluded from the range of values; and performing the selected operation on the values in the field of the table.

20. The system of claim 19, wherein the query processor performs the determined set of operations on the values in the field of the table further by simultaneously performing the selected operation on at least two values in the values in the field of the table.

* * * * *